(12) United States Patent
Kunc et al.

(10) Patent No.: US 8,315,585 B2
(45) Date of Patent: Nov. 20, 2012

(54) METHOD AND CIRCUIT FOR A FAST REDUCTION IN VOLTAGE OF A DC COMPONENT AND LOW-FREQUENCY COMPONENTS AT A MIXING CIRCUIT OUTPUT IN A RECEIVER OF A UHF TRANSCEIVER

(76) Inventors: Vinko Kunc, Ljubljana (SI); Anton Stern, Preddvor (SI); Andrej Vodopivec, Ljubljana (SI); Maja Atanasijevic-Kunc, Ljubljana (SI)

( * ) Notice: Subject to any disclaimer, the term of this patent is extended or adjusted under 35 U.S.C. 154(b) by 200 days.

(21) Appl. No.: 12/735,721

(22) PCT Filed: Feb. 13, 2009

(86) PCT No.: PCT/SI2009/000005
§ 371 (c)(1),
(2), (4) Date: Oct. 20, 2010

(87) PCT Pub. No.: WO2009/102283
PCT Pub. Date: Aug. 20, 2009

(65) Prior Publication Data
US 2011/0034143 A1 Feb. 10, 2011

(30) Foreign Application Priority Data
Feb. 13, 2008 (SI) .................................. 200800033

(51) Int. Cl.
*H04B 1/26* (2006.01)
(52) U.S. Cl. ...................... 455/313; 455/232.1; 455/334
(58) Field of Classification Search .......... 455/313–334, 455/232.1–253.2
See application file for complete search history.

(56) References Cited

U.S. PATENT DOCUMENTS

| | | | | |
|---|---|---|---|---|
| 5,933,771 | A | * | 8/1999 | Tiller et al. ................... 455/333 |
| 7,952,408 | B2 | * | 5/2011 | Eisenstadt et al. ............ 327/231 |
| 2001/0031629 | A1 | * | 10/2001 | Elder et al. ................... 455/323 |
| 2004/0219898 | A1 | * | 11/2004 | Bult et al. .................. 455/252.1 |
| 2005/0130617 | A1 | * | 6/2005 | Burns et al. ................. 455/234.1 |
| 2005/0255820 | A1 | * | 11/2005 | Ruhm et al. .................. 455/313 |
| 2007/0184803 | A1 | | 8/2007 | Aytur |
| 2009/0029668 | A1 | * | 1/2009 | Hsieh et al. ................... 455/324 |

OTHER PUBLICATIONS

Razavi et al., "A 5.2 Ghz CMOS Receiver with 62-dB Image Rejection", IEEE J of Solid-State Circuits, vol. 36, No. 5, pp. 810-815, May 2001.

(Continued)

*Primary Examiner* — Lana N Le
(74) *Attorney, Agent, or Firm* — Jacobson Holman PLLC

(57) ABSTRACT

A difference between an output current signal (mos) of the mixing circuit (MC) and a current from a controlled current source (CCS) is conducted to an input of an operational amplifier (A). A control voltage (cv) for said current source is a voltage at the output of the operational amplifier (A) being filtered by a low-pass filter, whose limiting frequency equals a low frequency limit of the modulation signal in the received signal (rs). The method is speeded up in that the limiting frequency of the low-pass filter is increased by two to three orders of magnitude at the beginning and is gradually lowered to said value. A rather short time duration of the transient process is achieved so that the working point with a low voltage of the DC component and low-frequency components is set at least five times faster than so far.

16 Claims, 2 Drawing Sheets

OTHER PUBLICATIONS

Chiu et al., "A 900 MHz UHF RFID Reader Transceiver IC", IEEE J of Solid-State Circuits, vol. 42, No. 12, pp. 2822-2833, Dec. 2007, [abstract only].

Gatta et al., "A Fully Integrated 0,18 μm CMOS Direct Coversion receiver Front-End With On-Chip LO for UMTS", IEEE J of Solid-State Circuits, vol. 39, No. 1, pp. 15-23, Jan. 2004, [abstract only].

Francesco Gatta et al.; A Fully Integrated 0.18μm CMOS Direct Conversion Receiver Front-End With On-Chip LO for UMTS; IEEE J. of Solid-State Circuits, vol. 39, No. 1, Jan. 2004, pp. 15-23.

Scott Chiu et al.; A 900 MHz UHF RFID Reader Transceiver IC, IEEE J. Of Solid-State Circuits, vol. 42, No. 12, Dec. 2007, pp. 2822-2833.

* cited by examiner

METHOD AND CIRCUIT FOR A FAST REDUCTION IN VOLTAGE OF A DC COMPONENT AND LOW-FREQUENCY COMPONENTS AT A MIXING CIRCUIT OUTPUT IN A RECEIVER OF A UHF TRANSCEIVER

This is a national stage of PCT/SI09/000005 filed Feb. 13, 2009 and published in English, which has a priority of Slovenia no. P 2008 0 0033 filed Feb. 13, 2008, by hereby incorporated reference.

The invention concerns a method for a fast reduction in voltage of a DC component and low-frequency components at an output of a mixing circuit in a receiver of a UHF transceiver, e.g. a smart card interrogator, upon each start of receiving after the completion of transceiver transmission. The invention moreover concerns a circuit for carrying out said method.

FIG. 1 schematically represents a signal los of a local oscillator in a receiver (window I), a modulated received signal rs (window II), an output signal mos of a mixing circuit (window III), which signal comprises a higher frequency component and a lower frequency component and is cleaned by means of a low-pass filter to obtain a filtered output signal fmos of the mixing circuit (window IV). Before this signal is further processed by filtration within a frequency band of a modulation signal present in a received signal rs and by amplification the voltage of a DC component and of those low-frequency components comprised therein, whose frequency lies below a low frequency limit of the modulation signal in the received signal rs, should be reduced.

Said reduction in voltage of the DC component and of the low-frequency components may be performed by means of a high-pass filter (B. Razavi, "A 5.2-GHz CMOS Receiver with 62-dB Image Rejection", IEEE J. of Solid-State Circuits, Vol. 36, No. 5, pp. 810-815, May 2001), which passes a frequency band of a demodulated received signal and retains a DC component and said low-frequency components, yet the following difficulties are encountered.

The input stage in a receiver of a UHF transceiver is a mixing circuit MC (FIG. 2). The mixing circuit MC is represented in FIG. 2 as provided with a load circuit LC; LRp, LRn. The mixing circuit MC multiplies the modulated received signal rs by the signal los of the local oscillator and generates differential output current signals mosp, mosn—only one of the differential signals is shown in FIG. 1 each time. A high-pass filter may be foreseen with capacitors ECp, ECn in connection with resistors Rp, Rn, if resistance of resistors Rp, Rn is much higher than the resistance of the resistors LRp, LRn. Said units ECp, Rp; ECn, Rn are placed in front of an operational amplifier A, whose output terminals are connected through a resistor FBRp and FBPn, respectively, in a return path to input terminals of said operational amplifier. The voltage signal osl at the outputs of the operational amplifier A should have a reduced voltage of a DC component and those low-frequency components, whose frequency lies below a low frequency limit of the modulation signal in the received signal rs. To ensure low noise of the receiver the capacitors ECp, ECn are foreseen to have capacitance in the order of magnitude of 10 nF. They are embodied as external capacitors outside of an otherwise integrated circuit of the UHF transceiver. Unfortunately, this is the reason why their capacitance cannot be set by simply switching elements, although a modification of the low frequency limit of the receiver frequency range would be attained most simply just by modifying capacitances of the capacitors ECp, ECn because this would not affect other parameters.

A need to set the receiver frequency range is obvious. Smart cards operating at a frequency of 900 MHz use a frequency range with a low limit frequency having a wide margin from 40 kHz to 640 kHz for the modulation of interrogator signal. The interrogator should have an adjustable receiving frequency range. The low frequency limit of the receiver frequency range can obviously be adjusted also by adjusting the dominant ones of the resistors Rp, Rn; LRp, LRn. The resistors LRp, LRn are dominant, however, they are part of the mixing circuit MC and may be adjusted only within a very narrow range. A considerable change in their resistances would namely cause an unacceptable change in voltage of said DC component. As far as the system is considered it is also feasible that the resistors Rp, Rn having higher resistance are used to set the frequency range thus becoming dominant resistors. Yet this is undesired since it would cause an increase in thermal noise voltage in the interrogator receiver.

The level of the signal received by the interrogator receiver is always relatively high; its r.m.s. voltage ranges from 100 mV to 2 V. The r.m.s. voltage of the DC component at the output of the mixing circuit MC is high as well and amounts to a few volts. When the smart card modulates the amplitude of the received interrogator signal, it is a shallow modulation and the output current signal mos of the mixing circuit MC is also shallow modulated. The output current signal mos of the mixing circuit MC is essentially composed of a demodulated smart card signal in the frequency band above said low limit frequency of the modulation signal in the received signal and of the high DC component.

A high ratio 49 kHz to 640 kHz between the low and the high value of the possible low frequency in the frequency band of the demodulated smart card signal at the output of the mixing circuit MC decreased to merely 1,040 MHz to 1,640 MHz, if the frequency of the receiver local oscillator in the interrogator is shifted by an intermediate frequency of 1 MHz to 901 MHz. In this case no change in setting of the low frequency limit of the receiver frequency range in the interrogator is needed. The interrogator further needs a unit to shift the frequency of the receiver local oscillator and an additional demodulation circuit to separate the smart card modulation signal from said intermediate frequency.

It is further known an integrated circuit INTEL R1000 (S. Chiu et al., "A 900 MHz UHF RFID Reader Transceiver IC", IEEE J. of Solid-State Circuits, Vol. 42, No. 12,pp. 2822-2833, Dec. 2007), in which an external capacitor is foreseen as a separating capacitor between a mixer stage and a low-frequency stage due to a low-noise requirement. Its capacitance cannot change during the operation of the transceiver unit. In order that the transmitting would not cause considerable voltage variations on the external capacitor both a series switch to the low-frequency stage and a switch to the ground open upon the completion of receiving and close at the next receiving. Moreover, the switch to the ground provides for a faster charging of the external capacitor in the proximity of the operating point. The represented circuit cannot determine a proper moment to switch said switches. Determination of this moment is rather delicate, especially with communication protocols that foresee a very short time interval provided for the transition to the receiving upon the completion of the transceiver transmitting, e.g. with the communication protocol EPC Gen 2. If the switching operation is too fast, it had occurred during the transmitting transient process and it may cause quite different voltages on the external capacitor. However, if the switching operation is too late, it may cause that part of the valid received signal is lost. Moreover, the time constant of the coupling between the mixer stage and the low-frequency stage can be changed only by means of adjustable resistors.

There is also known an integrated circuit using a feedback loop to set voltage of a DC component between a mixer stage and a low-frequency stage (F. Gatta et al., "A Fully Integrated 0,18 μm CMOS Direct Conversion Receiver Front-End With On-Chip LO for UMTS", IEEE J. of Solid-State Circuits, Vol. 39, No. 1, pp. 15-23, Jan. 2004). The DC component at the output of the mixer stage is suppressed in that an integrator outputs an additional current to two load resistors through two transistors to match the current. Matching of voltages across said resistors is hence reached by means of an additional current on a higher level. Herewith a dynamic range of the mixer stage is reduced. The time constant of the coupling between the mixer stage and the low-frequency stage remains steady and is determined by a resistor and a capacitor in the integrator as well by a gain of the whole loop.

The invention solves the technical problem what should be a method for a fast reduction in voltage of a DC component and those low-frequency components, whose frequency lies below a low frequency limit of a modulation signal in a received signal, at the output of a mixing circuit in a receiver of a UHF transceiver within a rather short time interval being defined by the communication protocol that said voltage reduction will be carried out with a settable degree of accuracy without an increase in thermic noise voltage in said receiver. The invention also solves the technical problem what should be a circuit to carry out such method.

Said technical problem is solved by the method of the invention for a fast reduction in voltage of a DC component and said low-frequency components at the output of a mixing circuit in a receiver of a UHF transceiver as characterized by the features of the characterizing portion of the first claim and the subclaims hereto characterize variants of the embodiment of said method, as well by the circuit of the invention for carrying out the method of the invention as characterized by the features of the characterizing portion of the tenth claim and the subclaims hereto characterize variants of the embodiment of said circuit.

The method of the invention as carried out by the circuit of the invention distinguishes itself in that herewith a rather short time duration of the transient process is achieved so that the working point with a low voltage of the DC component and low-frequency components is set at least five times faster than in the known circuit by means of a high-pass filter. The circuit of the invention disposes of a larger input dynamic range because low voltage of said components is achieved by cancelling the current of said components. The operating sequence during the transient process can be set, yet the setting does not increase the input noise voltage.

DETAILED DESCRIPTION OF THE INVENTION

Figure 1:
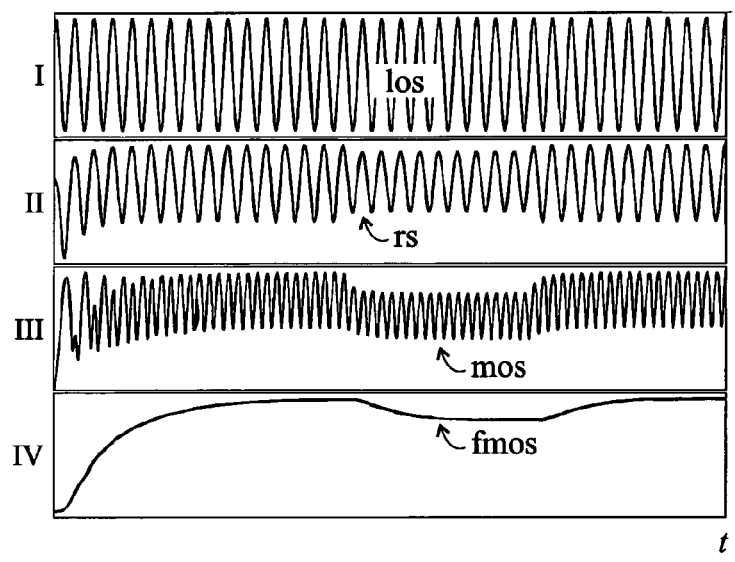
FIG. 1 in window I a time dependent signal los of local oscillator in a receiver, in window II a time dependent modulated received signal rs, in window III a time dependent output signal mos of mixing circuit and in window IV a filtered output signal fmos of a mixing circuit, FIG. 2 an input stage in a reciever of a UHF transceiver including a mixing circuit MC, FIG. 3 in a schematic way and in a differential presentation, the circuit for a fast reduction in voltage of a DC component and low-frequency components at the output of a mixing circuit in a receiver of a UHF transceiver, and FIG. 4 in window I the time dependence of the voltage signal at the output of the operational amplifier, in window II the time dependence of the control voltage for the controlled current source and in window III the time dependence of signals for various settings.
Figure 2:
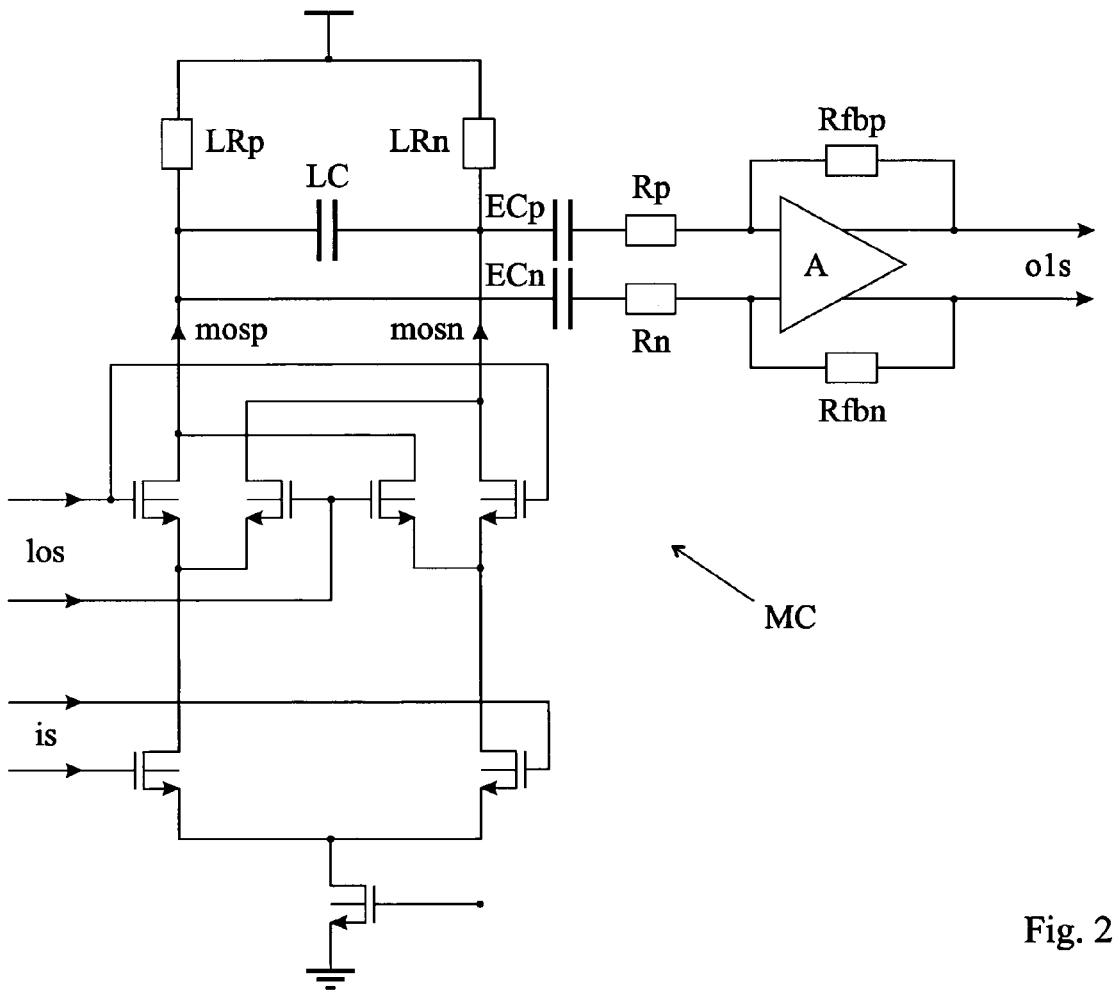
Figure 3:
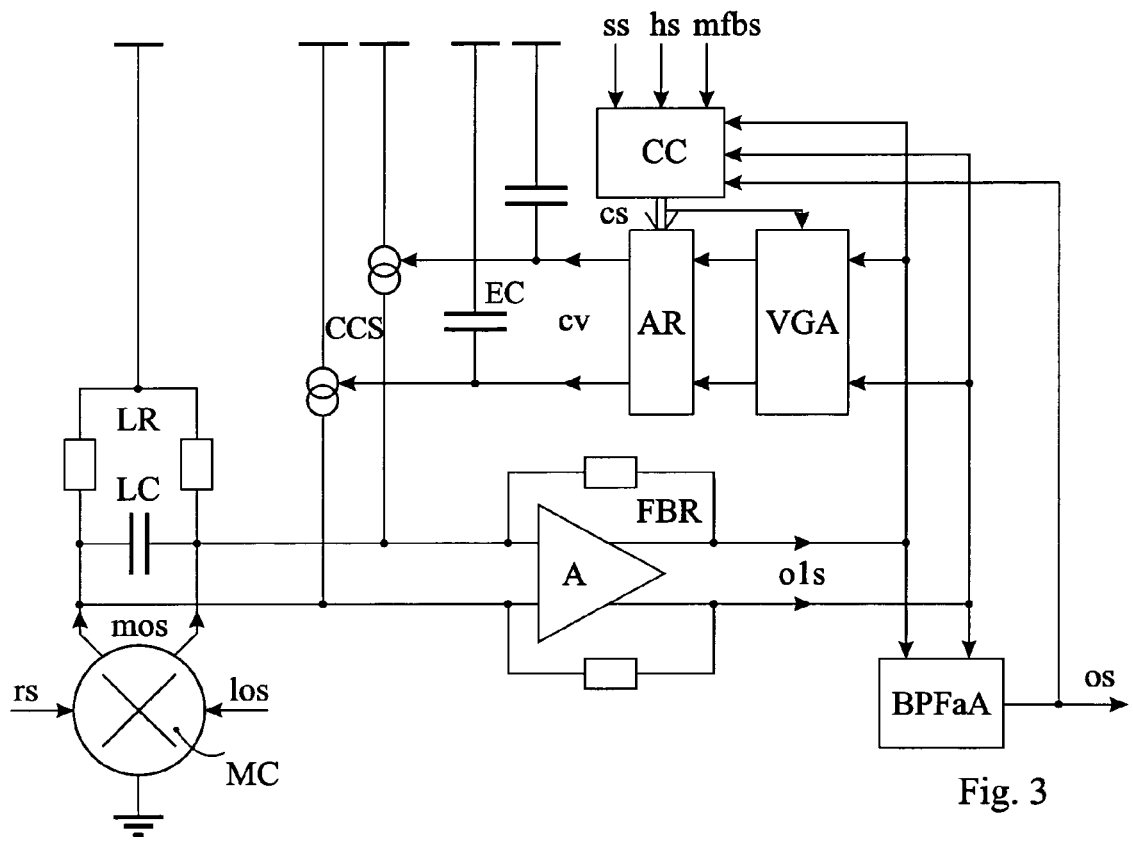

The invention will now be explained in more detail by way of the description of an embodiment of the method of the invention for a fast reduction in voltage of a DC component and low-frequency components at the output of a mixing circuit in a receiver of a UHF transceiver and of the description of an embodiment of the circuit of the invention for carrying out said method and with reference to FIGS. 3 and 4.

A circuit of the invention for a fast reduction in voltage of a DC component and low-frequency components, whose frequency lies below a low frequency limit of a modulation signal in a received signal rs, in an output current signal mos of a mixing circuit MC is schematically presented in FIG. 3; in the presented differential circuit two mutually corresponding signals or circuit units are present all over. The received signal rs as a first input signal and a signal los of a receiver local oscillator as a second input signal are conducted to inputs of the mixing circuit MC in the UHF transceiver. Components with a frequency lying above the double frequency of the signal los of the receiver local oscillator have already been eliminated from the output current signal mos by a low-pass filter.

The output current signal mos of the mixing circuit MC, whose output terminals are connected to supply through a load capacitor LC and two load resistors LR, is conducted to an input of an operational amplifier A. An output terminal of the operational amplifier A is connected through a resistor FBR in a return path to its input terminal.

The circuit of the invention comprises a controlled current source CCS, whose current is subtracted from an output current signal mos of the mixing circuit MC.

According to the invention, the output terminal of the operational amplifier A is connected through a variable-gain amplifier VGA and an adjustable resistor AR on the one hand to a control terminal of the controlled current source CCS and on the other hand to a supply source terminal through an external capacitor EC. The external capacitor EC is connected outside with respect to the integrated circuit.

A control circuit CC generates a control signal cs with respect to data carried by signals entering it. By means of the control signal cs resistance of the adjustable resistor AR is set. The connection of the adjustable resistor AR to the external capacitor EC determines an upper frequency limit of current components generated by the controlled current source CCS. Said upper frequency limit is determined according to a phase of the method as will be explained in the description of the method of the invention, namely as a low frequency limit of the modulation signal in the received signal rs or as a multiple of said low frequency limit.

The signals entering the control circuit CC are: a voltage signal ols from the output of the operational amplifier A, an output signal os of the circuit of the invention having a reduced voltage of said DC component and said low-frequency components, a start signal ss, which triggers a setting of the adjustable resistor AR whenever said voltage should be reduced, a hold signal hs, which freezes a value of said control voltage cv for controlling the controlled current source CCS whenever the UHF transceiver finished receiving and starts transmitting, and a signal mfbs carrying data on a frequency band of the modulation signal in the received signal rs.

The signal mfbs carrying data on a frequency band of the modulation signal in the received signal rs originates from a control unit on a higher level within the UHF transceiver where the information on a chosen protocol, data transmission speed et cetera is stored. A time interval T beginning at the end of transceiver transmission is also defined by the communication protocol. The protocol requires readiness to receive a new signal after the expiration of said time interval T. The received signal rs begins with a preamble. A correct DC voltage of the signal ols at the output of the operational amplifier A must settle from the completion of transmission and not later than to the middle of the preamble of the received signal rs.

The signal ols from the output of the operational amplifier A is conducted to an input of a filtering and amplifying circuit BPFaA, which passes and amplifies the frequency band of said modulation signal. The voltage of the DC component and the low-frequency components, whose frequency lies below the lower frequency limit of the modulation signal in the received signal rs, in the signal ols is reduced within the time interval T by such amount that the voltage of this signal ols falls within a first voltage window lvl, hvl (FIG. 4), which can be set when laying out the circuit. The output signal os of the filtering and amplifying circuit BPFaA is the output signal of the circuit of the invention and therefore, after the expiration of said time interval T, it has reduced voltage of the DC component and said low-frequency components within the first voltage window lvl, hvl.

The resistance of the adjustable resistor AR is settable over at least three decades. In connection with the external capacitor EC, it determines an upper limit frequency of the passband filter. This upper limit frequency must be settable from the low limit frequency of the modulation signal in the received signal rs up to a value higher by three orders of magnitude.

On the other hand, the resistance of the adjustable resistor AR can be set to a very high value or the connection between the adjustable resistor AR and the external capacitor EC may be broken. Till the next receiving, the hold signal hs thus freezes the value of said control voltage cv on the external capacitor EC provided for controlling the controlled current source after the UHF transceiver finished receiving the received signal rs and starts transmitting.

At the lowest values of resistance of the adjustable resistor AR, the stability of the feedback loop—including the operational amplifier A, the variable-gain amplifier VGA, the adjustable resistor AR in connection with the external capacitor EC and the controlled current source CCS—is ensured by setting the gain of the variable-gain amplifier VGA. In case of lowest values of resistance of the adjustable resistor AR, the stability of the feedback loop can also be ensured by connecting a resistor in series to the external capacitor EC.

Should the stability of the feedback loop allow it, a proportional amplifier or an integrator is used as the variable-gain amplifier VGA.

The continuation will present a method for a fast reduction in voltage of the DC component and low-frequency components, whose frequency lies below the low frequency limit of the modulation signal present in the received signal rs and which are comprised in an output current signal mos at the output of the mixing circuit MC in the receiver of the UHF transceiver. The description will refer to FIG. 3 and FIG. 4. Said voltage reduction should be carried out within a very short time interval T beginning at the completion of a UHF transceiver transmission and its duration being defined by the communication protocol.

According to the invention, the current from the controlled current source CCS, which is controlled by the control voltage cv, is subtracted from the output current signal mos of the mixing circuit MC. Components with a frequency lying above the double frequency of the signal los of the receiver local oscillator have already been eliminated from the output current signal mos of the mixing circuit MC.

The current obtained by said subtraction is conducted according to the invention to the input of the operational amplifier A. There, this current is cancelled by an equal current in the opposite direction, which flows from an output of the operational amplifier A through a resistor FBR in the return path back to its input. Therefore the resistance of the resistor LR is not significant and the circuit of the invention can also operate without the resistor LR.

Further, according to the invention, those components of the voltage signal ols from the output of the operational amplifier A are amplified, whose frequency lies below the upper frequency limit of the low-pass filter. The upper frequency limit of the low-pass filter is determined in connection with the capacitance of the external capacitor EC by setting suitable resistance of an adjustable resistor AR. At the very beginning of the receiving, the upper frequency limit of the low-pass filter is chosen up to three orders of magnitude above the low limit frequency of the modulation signal in the received signal rs. During further receiving it is lowered to the low limit frequency of said modulation signal.

Said control voltage cv is generated in that the amplified said DC component and low-frequency components of the voltage signal ols act on the control input terminal of the controlled current source CCS through the adjustable resistor AR being part of said low-pass filter.

Figure 4:
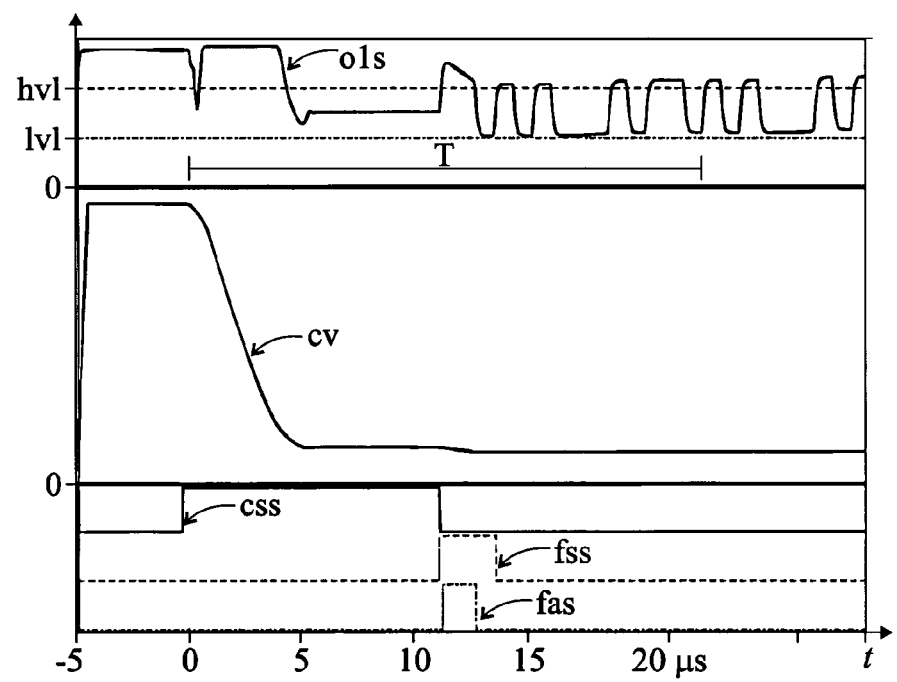

At the latest after the expiration of the time interval T, but in fact earlier, the voltage of said voltage signal ols at the output of the operational amplifier A should be in the first voltage window between a low voltage limit lvl and a high voltage limit hvl (window I in FIG. 4). In the meantime after the completion of transmitting, the voltage of the DC component and those low-frequency components, whose frequency lies below the lower frequency limit of the modulation signal in a received signal rs, has rapidly decreased. The voltage limits lvl and hvl are determined when laying out each individual circuit of the invention for carrying out the method of the invention.

Said voltage signal ols from the output of the operational amplifier A is continuously filtered by the pass-band filter passing components having frequencies comprised in the modulation signal of the received signal rs and the filtered signal is amplified as well. The output signal os with reduced voltage of the DC component and low-frequency components is hence obtained according to the method of the invention after said voltage signal ols has been properly cleaned.

To reach the voltage value of said voltage signal ols at the output of the operational amplifier A between the low voltage limit lvl and the high voltage limit hvl as soon as possible, a coarse setting of the circuit of the invention is used within no more than a first half of the time interval T. In said way by means of the coarse setting, all those components of the voltage signal ols from the output of the operational amplifier A are amplified, whose frequency lies below a frequency exceeding the low frequency limit of the modulation signal in the received signal rs by two to three orders of magnitude.

In order to reach and settle the voltage value of said voltage signal ols at the output of the operational amplifier A between the low voltage limit lvl and the high voltage limit hvl as soon as possible a fine setting of the circuit of the invention is used within less than a subsequent one quarter of the time interval T. By means of the fine setting all those components of the voltage signal ols at the output of the operational amplifier A are amplified, whose frequency is below a frequency exceeding the low frequency limit of the modulation signal in the received signal rs by five to twenty times. Fine setting immediately follows coarse setting.

Fine setting is carried out also each time during receiving, when voltage of said voltage signal ols at the output of the operational amplifier A remains outside the first voltage window lvl, hvl by twice the time period than it should with regard to encoding of the received signal rs.

Whenever the control circuit CC detects that the voltage of said output signal os of the circuit of the invention having reduced voltage of said DC component and said low-frequency components remains outside a second voltage window foreseen for said reduced voltage by twice the period than it should with regard to encoding of the received signal rs, finest setting is carried out. Said second voltage window for the signal, which has been already amplified now, is wider than the first voltage window lvl, hvl. Finest setting is carried out in a time interval shorter than one quarter of the time interval T. Finest setting amplifies those components of the voltage signal ols from the output of the operational amplifier A, whose frequency lies below a frequency, which exceeds the low frequency limit of the modulation signal in the received signal rs by two to four times.

The method of the invention foresees freezing of the value of the control voltage cv for controlling the controlled current source CCS after the UHF transceiver finished receiving and starts transmitting. This is accomplished by setting the resistance of the adjustable resistor AR to a very high value, said resistor being used to set the frequency range of the control voltage cv in connection with the external capacitor EC.

The continuation describes the operation of the circuit of the invention for a fast reduction in voltage of the DC component and low-frequency components at the output of the mixing circuit MC in the receiver of the UHF transceiver within a time interval T as defined by the communication protocol and beginning upon the completion of a transceiver transmission.

The coarse setting signal css triggers the setting of the circuit of the invention at the beginning of receiving at the moment t=0 (window III in FIG. 4). Therefore the control voltage cv on the control terminal of the controlled current source CCS decreases quickly (window II in FIG. 4) resulting in a decrease in the voltage of the signal ols at the output of the operational amplifier A (window I in FIG. 4) between the low voltage level lvl and the high voltage level hvl of the first voltage window for the circuit of the invention. A first receiving by this circuit is represented in FIG. 4; namely at the beginning of receiving at the moment t=0, the control voltage cv has not yet reached a suitable value that it might have retained from the foregoing receiving. The output current of the controlled current source CCS approaches the value of the unwanted components comprised in the output current signal mos of the mixing circuit MC already after 5 μs. The voltage of the signal ols at the output of the operational amplifier A at that time already reached the suitable working point in the middle of the first voltage window lvl, hvl.

The fine setting signal fss now triggers the setting of the circuit of the invention because the signal ols crossed the limits of the first voltage window lvl, hvl. The fast adjustment signal fas performs an equal task. The preamble of the received signal rs arrived at the same time. The control voltage cv is settled already. The fine setting of the circuit of the invention is finished 13,5 μs after the beginning of receiving. The fast correction of the working point is accomplished before the useful part of the received signal rs has arrived.

The following parameters have been used in the preferred embodiment of the circuit of the invention. The capacitance of the external capacitor EC lies between 4.7 nF and 47nF. The lowest resistance of the adjustable resistor AR lies between 100Ω and 1000Ω, the highest one being 2 MΩ. The width of the first voltage window lvl, hvl is 200 mV and the width of the second voltage window is 2 V. The gain of the variable-gain amplifier VGA is 20. The coarse setting is finished in 8 μs and the fine setting in 2 μs. The low limit frequency of the circuit of the invention is settable to 5 kHz to 150 kHz without any appearance of noticeable input noise voltages. The setting of the working point in the first stage is achieved by means of the circuit of the invention in 15 μs, this time interval being at least by five times shorter than with the known circuit provided by a high-pass filter.

The invention claimed is:

1. Method for a fast reduction in voltage of a DC component and low-frequency components at the output of a mixing circuit (MC) in a receiver of a UHF transceiver within a time interval (T) beginning at an end of transceiver transmission and being defined by the communication protocol,
    characterized in
    that a current from a controlled current source (CCS),
        which is controlled by a control voltage (cv),
        is subtracted from an output current signal (mos) of the mixing circuit (MC),
    that a current resulting from said subtraction is conducted to an input of an operational amplifier (A) and said current is there cancelled by an equal current in the opposite direction,
    which current flows from an output of the operational amplifier (A) through a resistor (FBR) in a return path back to its input, that those components of a voltage signal (ols) from the output of the operational amplifier (A) are amplified,
    whose frequency lies first below the higher and later below the lower multiple of the lower frequency limit of a modulation signal in a received signal (rs) and finally lies below the lower frequency limit of the modulation signal in the received signal (rs),
    that said control voltage (cv) is generated
    in that said amplified DC component and low-frequency components of the voltage signal (ols) act on a control terminal of the controlled current source (CCS) through a variable-gain amplifier (VGA) and an adjustable resistor (AR)
    and that after expiration of said time interval (T)
    when the voltage of said voltage signal (osl) at the output of the operational amplifier (A),
    in which signal the voltage of said DC component and those low-frequency components has been reduced by then,
    whose frequency is below the low frequency limit of the modulation signal in the received signal (rs),
    should be in a first voltage window between a low voltage limit (lvl) and a high voltage limit (hvl),
    an output signal (os) having the reduced voltage of said DC component and low-frequency components is generated
    in that said voltage signal (ols) from the output of the operational amplifier (A) is filtered by a band-pass filter, which passes components in the frequency band of said modulation signal, and
    is amplified.

2. Method as recited in claim 1, characterized in that voltage of said voltage signal (ols) at the output of the operational amplifier (A) being between the low voltage limit (lvl) and the high voltage limit (hvl) is attained by means of a coarse setting faster than in a half of said time interval (T), at which coarse setting all those components of the voltage signal (ols) at the output of the operational amplifier (A) are amplified,
    whose frequency lies below a frequency,
    which exceeds the low frequency limit of the modulation signal in the received signal (rs) by two to three orders of magnitude.

3. Method as recited in claim 2, characterized in that voltage of said voltage signal (ols) at the output of the operational amplifier (A) between the low voltage limit (lvl) and the high voltage limit (hvl) is attained by means of a fine setting faster than within a quarter of said time interval (T), at which fine setting all those components of the voltage signal (ols) at the output of the operational amplifier (A) are amplified,
whose frequency lies below a frequency,
which exceeds the low frequency limit of the modulation signal in the received signal (rs) by five to twenty times.

4. Method as recited in claim 3, characterized in that the fine setting is carried out immediately follows coarse setting.

5. Method as recited in claim 3, characterized in that fine setting is carried out
whenever voltage of said voltage signal (ols) at the output of the operational amplifier (A) remains outside the first voltage window by twice longer
than it should be allowed with regard to encoding of the received signal (rs).

6. Method as recited in claim 1, characterized in
that finest setting is carried out
whenever the voltage of said output signal (os) having reduced voltage of said DC component and low-frequency components remains outside a second voltage window twice longer
than it should be allowed with regard to encoding of the received signal (rs).

7. Method as recited in claim 6, characterized in that the voltage of said output signal (os) having reduced voltage of said DC component and low-frequency components within said foreseen wider voltage window is attained by means of finest setting faster than within a quarter of said time interval (T), at which finest setting those components of the voltage signal (ols) from the output of the operational amplifier (A) are amplified,
whose frequency lies below a frequency,
which exceeds the low frequency limit of the modulation signal in the received signal (rs) by two to four times.

8. Method as recited in claim 1, characterized in
that a value of the control voltage (cv) for controlling the controlled current source (CCS) is frozen
after the UHF transceiver finished receiving and starts transmitting.

9. Method as recited in claim 8, characterized in that said freezing of the value of the control voltage (cv) is carried out
in that the resistance of the adjustable resistor (AR), by means of which resistor and in connection with an external capacitor (EC) a frequency range of the control voltage (cv) is determined,
is set to a very high value.

10. Circuit for a fast reduction in voltage of a DC component and low-frequency components at the output of a mixing circuit (MC) in a receiver of a UHF transceiver within a time interval (T) beginning at the end of transceiver transmission and being defined by the communication protocol,
characterized in
that an output current signal (mos) of the mixing circuit (MC) is conducted to an input of an operational amplifier (A),
whose output terminal is connected through a resistor (FBR) in a return path to an input terminal of the operational amplifier (A),
that a current from a controlled current source (CCS) is subtracted from an output current signal (mos) of the mixing circuit (MC),
that the output terminal of the operational amplifier (A) is connected through a variable-gain amplifier (VGA) and an adjustable resistor (AR)
on the one hand to a control terminal of the controlled current source (CCS) and
on the other hand to a terminal of a supply source through a capacitor (EC) outside the integrated circuit,
that a control circuit (CC), to whose inputs
a voltage signal (ols) from the output of the operational amplifier (A),
an output signal (os) having a reduced voltage of said DC component and low-frequency components,
a start signal (ss), which triggers a setting of the adjustable resistor (AR),
a hold signal (hs), which freezes a value of said control voltage (cv) for controlling the controlled current source (CCS) whenever the UHF transceiver finished receiving and starts transmitting, and
a signal (mfbs) carrying data on a frequency band of the modulation signal in a received signal (rs), are conducted,
generates a control signal (cs) out of said signals,
by means of which control signal (cs) a resistance of the adjustable resistor (AR) is set in such manner
that an upper frequency limit of current components generated by the controlled current source (CCS) is determined in connection with the external capacitor (EC) as a low frequency limit of the modulation signal in the received signal (rs) or as a multiple of said low frequency limit,
and that the voltage signal (ols) from the output of the operational amplifier (A) is conducted to an input of a circuit (BPFaA),
which is both a band-pass filter for components in the frequency band of said modulation signal as well as an amplifier and wherefrom said output signal (os) having reduced voltage of the DC component and the low-frequency components is outputted,
whose frequency lies below the lower frequency limit of a modulation signal in the received signal (rs).

11. Circuit as recited in claim 10, characterized in that the resistance of the adjustable resistor (AR) can be set over three decades.

12. Circuit as recited in claim 11, characterized in that stability of a feedback loop at lowest values of the resistance of the adjustable resistor (AR),
which feedback loop includes the operational amplifier (A), the variable-gain amplifier (VGA), the adjustable resistor (AR) in connection with the external capacitor (EC) and the controlled current source (CCS),
is ensured by setting the gain of the variable-gain amplifier (VGA) by means of the control circuit (CC).

13. Circuit as recited in claim 12, characterized in that the variable-gain amplifier (VGA) is a proportional amplifier.

14. Circuit as recited in claim 12, characterized in that the variable-gain amplifier (VGA) is an integrator.

15. Circuit according to claim 11, characterized in
that stability of the feedback loop at the lowest values of the resistance of the adjustable resistor (AR) is ensured by connecting a series resistor to the external capacitor (EC).

16. Circuit according to claim 11, characterized in
that the hold signal (hs) sets the resistance of the adjustable resistor (AR) to a very high value
by breaking the connection between the adjustable resistor (AR) and the external capacitor (EC).

* * * * *